(12) United States Patent
Lee

(10) Patent No.: US 11,275,741 B2
(45) Date of Patent: Mar. 15, 2022

(54) MERGE JOIN SYSTEM AND METHOD

(71) Applicant: ELECTRONICS AND TELECOMMUNICATIONS RESEARCH INSTITUTE, Daejeon (KR)

(72) Inventor: Hun Soon Lee, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 516 days.

(21) Appl. No.: 16/193,419

(22) Filed: Nov. 16, 2018

(65) Prior Publication Data

US 2019/0179818 A1 Jun. 13, 2019

(30) Foreign Application Priority Data

Dec. 13, 2017 (KR) .................. 10-2017-0171505

(51) Int. Cl.
| | | |
|---|---|---|
| G06F 17/00 | (2019.01) | |
| G06F 7/00 | (2006.01) | |
| G06F 16/2455 | (2019.01) | |
| G06F 7/14 | (2006.01) | |
| G06F 16/2458 | (2019.01) | |

(52) U.S. Cl.
CPC .......... *G06F 16/2456* (2019.01); *G06F 7/14* (2013.01); *G06F 16/2458* (2019.01)

(58) Field of Classification Search
CPC ..... G06F 16/2456; G06F 16/2458; G06F 7/14

USPC ....................................................... 707/714
See application file for complete search history.

(56) References Cited

U.S. PATENT DOCUMENTS

| | | | |
|---|---|---|---|
| 6,185,557 B1 | 2/2001 | Liu | |
| 9,824,128 B1* | 11/2017 | Maluf | ............... G06F 16/256 |
| 2016/0364211 A1 | 12/2016 | Chau et al. | |
| 2017/0270162 A1 | 9/2017 | Lee et al. | |

OTHER PUBLICATIONS

Benjamin Schlegel et al., "k-Ary Search on Modern Processors", Proceedings of the Fifth International Workshop on Data Management on New Hardware (DaMoN 2009), pp. 52-60, Jun. 28, 2009.

* cited by examiner

*Primary Examiner* — Pavan Mamillapalli
(74) *Attorney, Agent, or Firm* — Rabin & Berdo, P.C.

(57) ABSTRACT

A merge join method by a merge join system including a database is provided. The merge join system unequally divides data after a current position of a join column participating in merge join in the database into K partitions, K being greater than 2, and compares the first value of each of remaining partitions excluding the first partition from the K partitions with a value to be searched for the merge join, in order to check whether the first value and the value to be searched satisfy a specific condition. Further, the merge join system determines a partition in which the value to be searched is expected to exist based on a comparison result, and applies a k-ary search to the determined partition.

20 Claims, 8 Drawing Sheets

MERGE JOIN SYSTEM AND METHOD

CROSS-REFERENCE TO RELATED APPLICATION

This application claims priority to and the benefit of Korean Patent Application No. 10-2017-0171505 filed in the Korean Intellectual Property Office on Dec. 13, 2017, the entire contents of which are incorporated herein by reference.

BACKGROUND

(a) Field

The present invention generally relates to a system and method for merge join.

(b) Description of the Related Art

Join is an operation that brings data satisfying a certain selection condition for one or more columns from one or more tables. A column used for the selection condition in the join is called a join column. A result of the join operation is generated by the Cartesian product of rows of a table satisfying the selection condition. Join operation is used very commonly to construct query result in the database management system. And it is very important operation for the performance of database management system because it causes heavy IOs (input/outputs) and calculations. The join operation can be classified into merge join and hash join depending on its method. The merge join is the frequently used join operation when there is a large amount of data, and performs operation by sequentially traversing sorted data from the beginning.

In the merge join, it is frequently required to search for data satisfying a specific condition, so how the search process is efficiently performed is very important. In the conventional merge join, many comparisons are performed to search for a value that is greater than or equal to a particular value, or to generate a subset consisting of the same values as the particular value. The comparison is expressed as a conditional statement, and a failure of branch prediction of the conditional statement at runtime causes a command pipeline stall, which is a major cause of degrading overall performance. Further, in the merge join, since the sorted data are processed while being sequentially scanned from the beginning, it is highly likely that the data to be searched are close to the current position. However, the conventional merge join does not fully use the characteristics of the sorted data where the similar values are stored in proximity, when constructing the subsets participating in the join. As a result, it cannot quickly perform the join. And there is a room for improvement.

In addition, as the computing technology advances, commodity processors support vector-based processing as well as scalar-based processing by providing vector registers and a set of instructions which can use the vector registers. Furthermore, as the processor's microarchitecture evolves, the size of the available vector register continues to increase. For example, in Intel CPU, the Skylake microarchitecture with 512-bit vector registers and AVX512 instructions has been introduced and used. The AVX512 instruction can process sixteen 32-bit sized data simultaneously. However, since the conventional merge join does not use the parallel processing employing the vector register even when the process operates on the system equipped with the processor supporting the vector processing, the merge join cannot be quickly performed compared with the system performance. i.e., the conventional merge join does not fully utilize the computing power of the modern system.

SUMMARY

An embodiment of the present invention provides a merge join system and method for capable of quickly performing merge join.

According to an embodiment of the present invention, a merge join method by a merge join system including a database is provided. The merge join method includes unequally dividing data after a current position of a join column participating in merge join in the database into K partitions, K being greater than 2, comparing the first value of each of remaining partitions excluding the first partition from the K partitions with a value to be searched for the merge join, in order to check whether the first value and the value to be searched satisfy a specific condition, determining a partition in which the value to be searched is expected to exist based on a comparison result, and applying a k-ary search to the determined partition.

A partition size of each of the first to the (K−1)-th partitions among the K partitions may be a first size, and a partition size of a last partition in the K partitions may be a second size being greater than the first size.

The merge join method may further include, when the determined partition is the last partition, increasing the partition size to be used in a next search to a third size.

In this case, the third size may be K times of the first size.

Applying the k-ary search may include unequally dividing the last partition into K new partitions, comparing the first value of each of remaining new partitions excluding the first new partition from the K new partitions with the value to be searched in order to check whether the first value and the value to be searched satisfy the specific condition, determining a new partition in which the value to be searched is expected to exist based on a comparison result, and applying a k-ary search to the determined new partition.

The merge join method may further include determining $K^{ceil(log_K Rate)}$ as the first size. Here, the Rate may be a first number divided by a second number, and the first number and the second number are a large number and a small number, respectively, between the number of data in the join column and the number of data in another column participating in the merge join.

Applying the k-ary search may include performing the k-ary search, which equally divides the determined partition into K partitions, to the determined partition.

Comparing the first value may include sequentially loading the first values of the remaining partitions into a first vector register, loading the value to be searched into a second vector register, and performing a vector comparison on the first vector register and the second vector register to generate a comparison result mask. Determining the partition may include determining the partition in which the value to be searched is expected to exist based on the comparison result mask.

It may be used the most significant bits of the comparison results to generate the comparison result mask.

According to another embodiment of the present invention, a merge join method by a merge join system including a database is provided. The merge join method includes selecting a search method to be used for a current position of a join column participating in merge join in the database from among a plurality of search methods including a modified k-ary search, and performing the modified k-ary search when the modified k-ary search is selected. Performing the modified k-ary search includes unequally dividing data after the current position into K partitions, K being greater than 2, comparing the first value of each of remaining partitions excluding the first partition from the K partitions with a value to be searched for the merge join, in order to check whether the first value and the value to be searched satisfy a specific condition, determining a partition in which the value to be searched is expected to exist based on a comparison result, and applying a k-ary search to the determined partition.

Selecting the search method may include estimating a cost based on the number of comparisons required for each of the plurality of search methods at the current position, and selecting a search method which requires the least cost from among the plurality of search methods.

The plurality of search methods may further include a sequential search. In this case, selecting the search method may include calculating the number of comparisons required for a k-ary search, determining whether a value at a position apart the current position by the number of comparison satisfies the specific condition, selecting the sequential search when the value at the position apart from the current position satisfies the specific condition, and selecting the modified k-ary search when the value at the position apart from the current position does not satisfy the specific condition.

The number of comparisons may be determined as ceil $(\log_K \text{PartSize} \times (K-1))$. Here, the PartSize may be a partition size used when unequally dividing the data after the current position into the K partitions.

A partition size of each of the first to the (K−1)-th partitions among the K partitions may be the PartSize, and a partition size of a last partition in the K partitions may be a size being greater than the PartSize.

According to yet another embodiment of the present invention, a merge join system including a storage device that stores a database and a processor is provided. The processor, upon using a modified k-ary search, unequally divides data after a current position of a join column participating in merge join in the database into K partitions, K being greater than 2, compares the first value of each of remaining partitions excluding the first partition from the K partitions with a value to be searched for the merge join, in order to check whether the first value and the value to be searched satisfy a specific condition, determines a partition in which the value to be searched is expected to exist based on a comparison result, and applies a k-ary search to the determined partition.

A partition size of each of the first to the (K−1)-th partitions among the K partitions may be a first size, and a partition size of a last partition in the K partitions may be a second size being greater than the first size.

When the determined partition is the last partition, the processor may increase the partition size to be used in a next search to K times of the first size.

The processor may determine $K^{ceil(\log_K Rate)}$ as the first size. Here, the Rate may be a first number divided by a second number where the first number and the second number are a large number and a small number, respectively, between the number of data in the join column and the number of data in another column participating in the merge join.

The processor may sequentially load the first values of the remaining partitions into a first vector register, load the value to be searched into a second vector, perform a vector comparison on the first vector register and the second vector register to generates a comparison result mask, and determine the partition in which the value to be searched is expected to exist based on the comparison result mask.

The processor may estimate a cost based on a number of comparisons required for each of a plurality of search methods including the modified k-ary search at the current position, and select a search method which requires the least cost from among the plurality of search methods.

DETAILED DESCRIPTION OF THE EMBODIMENTS

Figure 1:
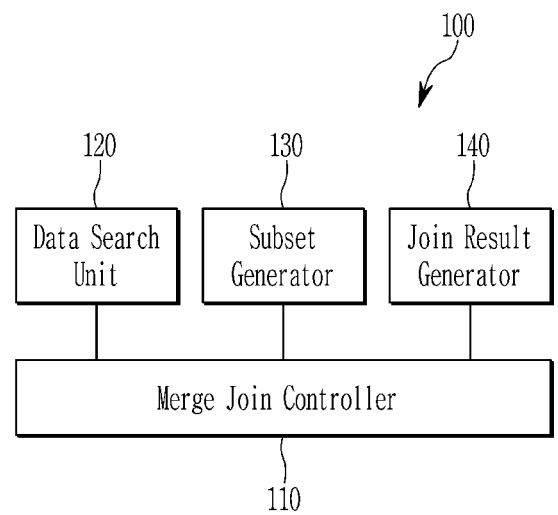
FIG. 1 is a schematic block diagram of a merge join system according to an embodiment of the present invention.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Figure 2:
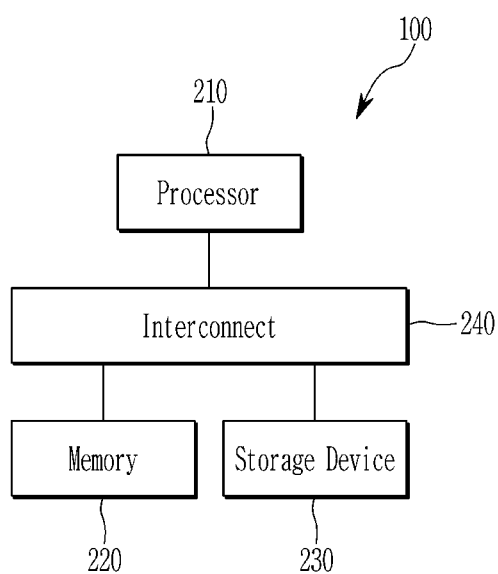
FIG. 2 is a drawing showing an example of a merge join system according to an embodiment of the present invention.

FIG. 1 is a schematic block diagram of a merge join system according to an embodiment of the present invention, and FIG. 2 is a drawing showing an example of a merge join system according to an embodiment of the present invention.

Referring to FIG. 1, a merge join system 100 according to an embodiment of the present invention includes a merge join controller 110, a data search unit 120, a subset generator 130, and a join result generator 140.

The merge join controller 110 controls a merge join process, and the data search unit 120 searches for positions of data satisfying a specific condition in columns of a table. The subset generator 130 constructs subsets participating in the join, and the join result generator 140 generates a join result by performing the Cartesian product on the two subsets participating in the join.

In some embodiments, the merge join system may be implemented as, for example, a computing device. In this case, as shown in FIG. 2, an example of the merge join system 100 implemented in the computing device may include a processor 210, a memory 220, a storage device 230, and an interconnect 240 for connecting the processor 210 and the storage device 230.

The processor 210 loads and executes instructions stored in the memory 220 or the storage device 230, and stores or loads data in or from the memory 220 or the storage device 230. The processor 210 may implement the merge join controller 110, the data search unit 120, the subset generator 130, and the join result generator 140 by executing the instructions. The processor 210 may be a processor such as a central processing unit (CPU), a graphic processing unit (GPU), or an accelerator, and may be a single processor or multiple processors. The storage device 230 stores a database including a table to be subjected to the merge join. The interconnect 240 transfers the instructions and data between the processor 210, the memory 220, and the storage device 230, and may be formed by various buses.

Figure 3:
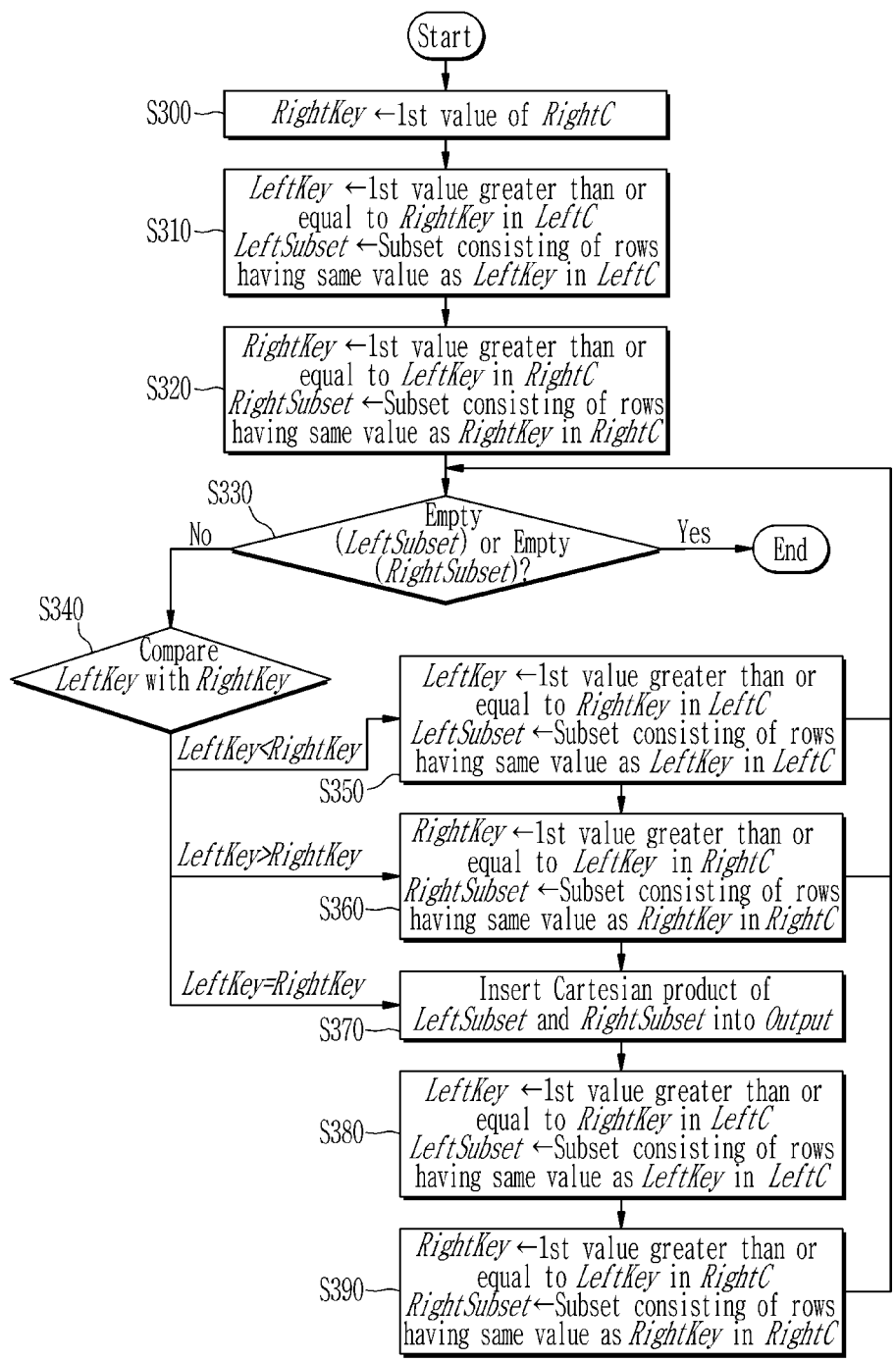
FIG. 3 is a flowchart showing a typical merge join method.

Next, a typical merge join method in a merge join system is described with reference to FIG. 3 is described with reference to FIG. 3.

FIG. 3 is a flowchart showing a typical merge join method. The merge join method of FIG. 3 shows a method of performing an equi-join on two tables. For convenience, it is assumed in FIG. 3 that each of the two tables (relations) (Left and Right) participating in the join has one column, and that data of the column LeftC of the table Left and the column RightC of the table Right are sorted in ascending order. However, the method described with reference to FIG. 3 is not limited to this example, and may be applied to a case where each table has multiple columns or data of each column are sorted in the other order. Hereinafter, for convenience, the column LeftC of the table Left is referred to as a left column LeftC, and the column RightC of the table Right is referred to as a right column RightC.

Referring to FIG. 3, the merge join system generates a join result Output with data of two columns LeftC and RightC participating in the join as input. In step S300, the merge join controller 110 first sets the first value of the right column RightC to RightKey. In step S310, the merge join controller 110 searches for the first value which is greater than or equal to RightKey after a current position LeftPos of the left column LeftC and sets the searched value as LeftKey by using the data search unit 120. Further, the merge join controller 110 constructs a subset LeftSubset consisting of rows having the same value as LeftKey after the current position LeftPos of the left column LeftC by using the subset generator 130. If there is no key value satisfying the condition in step S310, the subset LeftSubset becomes empty without any value. In step S320, the merge join controller 110 searches for the first value which is greater than or equal to LeftKey after a current position RightPos of the right column RightC and sets the searched value to RightKey by using the data search unit 120. Further, the merge join controller 110 constructs a subset RightSubset consisting of rows having the same value as RightKey after the current position RightPos of the right column RightC by using the subset generator 130. If there is no key value satisfying the condition in step S320, the subset RightSubset becomes empty without any value.

On the other hand, in FIG. 3, a position of the value set to RightKey becomes the current position RightPos of the right column RightC, and a position of the value set to LeftKey becomes the current position LeftPos of the left column LeftC.

Next, in step S330, the merge join controller 110 checks whether any of the two subsets LeftSubset and RightSubset is empty. If any of the two subsets LeftSubset and RightSubset is empty, the merge join controller 110 ends the merge join because there is no longer the same value in the join columns even though the data have been scanned to the end.

If both the subsets LeftSubset and RightSubset are not empty, that is, if both the subsets LeftSubset and RightSubset are constructed, the merge join controller 110 compares LeftKey and RightKey in step S340.

If RightKey is greater than LeftKey as the comparison result of step S340, in step S350, the merge join controller 110 searches for the first value which is greater than or equal to RightKey after the current position LeftPos of the left column LeftC and sets the searched value to new LeftKey by using the data searched unit 120. Further, the merge join controller 110 constructs a subset LeftSubset consisting of rows having the same value as LeftKey by using the subset generator 130. Subsequently, the merge join controller 110 performs the processing of step S330 again.

If LeftKey is greater than RightKey as the comparison result of step S340, in step S360, the merge join controller 110 searches for the first value which is greater than or equal to LeftKey after the current position RightPos of the right column RightC and sets the searched value to new RightKey by using the data search unit 120. Further, the merge join controller 110 constructs a subset RightSubset consisting of rows having the same value as the RightKey using the subset generator 130. Subsequently, the merge join controller 110 performs the processing of S330 again.

If LeftKey is equal to RightKey as the comparison result of step S340, the merge join controller 110 inserts the Cartesian product of the two subsets LeftSubset and RightSubset into the join result Output using the join result generator 140 in step S370. Then, in step S380, the merge join controller 110 searches for the first value which is greater than or equal to RightKey after the current position LeftPos of the left column LeftC and sets the searched value to new LeftKey by using the data search unit 120. Further, the merge join controller 110 constructs a subset LeftSubset consisting of rows having the same value as LeftKey by using the subset generator 130. In step S390, the merge join controller 110 searches for the first value which is greater than or equal to LeftKey after the current position RightPos of the right column RightC and sets the searched value to new RightKey by using the data search unit 120. Further, the merge join controller 110 constructs a subset RightSubset consisting of rows having the same value as RightKey by using the subset generator 130. Subsequently, the merge join controller 110 performs the processing of S330 again.

For convenience, it is exemplified in FIG. 3 that the values of the join columns are compared (S340) after the subsets are constructed (S310 and S320). Alternatively, the subsets may be constructed only when the values of the current positions LeftPos and RightPos in the join columns LeftC and RightC are compared and the compared values are the same.

As described with reference to FIG. 3, in the typical merge join process, it is frequently occurred to search for the data or the positions of data that satisfy the specific condition. That is, the typical merge join system performs many comparisons to search for the value which is greater than or equal to the specific value in the join process or to generate the subset consisting of the same values as the specific value. The comparisons are expressed as conditional statements. Failure of branch prediction at execution of the conditional statements causes instruction pipeline stall, which can be a main cause to deteriorate the overall performance. Therefore, it is better to minimize the use of conditional statements for comparison.

Generally, an analytical database has a large number of data and allows duplicated values, and the degree of duplication is high in the analytical database. Therefore, the analytical database may use a binary search, which is faster than sequential search, in order to search for data satisfying the specific condition for sorted data. In the merge join, since the sorted data are processed sequentially from the beginning, the data to be searched are likely to be close to the current position. That is, the sorted data have a locality where similar data are located close to each other. Therefore, it is not always possible for the binary search to search for the data satisfying the condition more quickly than the sequential search. A better method for searching for the data satisfying the specific condition in the sequential search and the binary search may vary depending on the data distribution. Therefore, it is possible to estimate the cost based on the number of comparisons at runtime and to select the search method that is less expensive between the sequential search and the binary search.

However, such a merge join method cannot sufficiently use the characteristics of sorted data where the similar values are stored in proximity, when constructing subsets participating in the join. Further, the merge join method cannot sufficiently use parallel processing employing a vector register when operating on a system equipped with a processor supporting vector processing. This can decrease user satisfaction with the system that provides the join operation.

Figure 4:
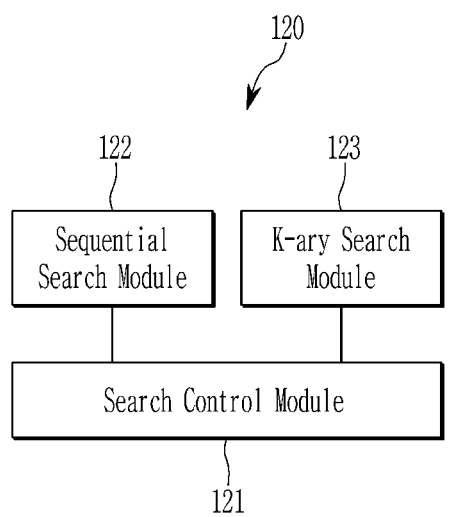
FIG. 4 is a schematic block diagram of a data search unit in a merge join system according to an embodiment of the present invention.

FIG. 4 is a schematic block diagram of a data search unit in a merge join system according to an embodiment of the present invention.

A data search unit 120 of a merge join system according to an embodiment of the present invention searches for data satisfying a specific condition by using a modified k-ary search considering a locality of sorted data. K used in the k-ary search is an integer greater than 2. For example, a system equipped with a processor which supports vector processing using 256-bit vector registers, upon searching for data satisfying a specific condition from sorted data of the double-precision floating point type (64-bit), can use the k-ary search wherein K is 5.

Since input data for join are sorted in merge join, the sequential search may be not slower than the other search method due to the locality of the sorted data. In some embodiments, the data search unit 120 may determine the less expensive search method between the sequential and k-ary searches. For this, the data search unit 120 includes a search control module 121, a sequential search module 122, and a k-ary search module 123 as shown in FIG. 4.

The search control module 121 controls a flow of a data search process, and determines a search method that is less expensive between the sequential search and the k-ary search by cost estimation based on the number of comparisons. The sequential search module 122 searches for data (i.e., a value) satisfying a specific condition by using the sequential search, and the k-ary search module 123 searches for data (i.e., a value) satisfying the specific condition by using the modified k-ary search considering the locality of sorted data.

Thus, the k-ary search module 123 can use the k-ary search instead of the sequential search or the binary search when searching for new data participating in the merge join or searching for data satisfying the specific condition to generate a subset. In the binary search, the search is performed while reducing a range of data to be searched to ½ based on a midpoint of a search range. However, in the k-ary search, the search range is divided into K pieces and (K−1) data on boundaries of the K pieces are compared. Thus, the k-ary search can be performed while reducing the range of data to be searched to 1/K. In order to search for desired data from N sorted data, the binary search requires approximately $\log_2 N$ comparisons, but the k-ary search requires approximately $\log_K N$ comparisons. Therefore, the k-ary search can significantly reduce the number of comparisons so that the desired value can be searched faster than the binary search. Further, since searching for data satisfying the specific condition has the great influence on the performance in the merge join, the fact that the data search is faster means that the merge join is faster.

On the other hand, since the input data for the join are sorted in the merge join, the data to be searched in the merge join are mostly located close to the current position. The k-ary search module 123 does not perform the k-ary search by dividing data, which are from the current location to the last data, into partitions of the same size, but performs the k-ary search based on unequal partitioning of dividing the sorted data into partitions of unequal sizes considering the locality. An embodiment of the unequal partitioning is described with reference to FIG. 5.

Figure 5:
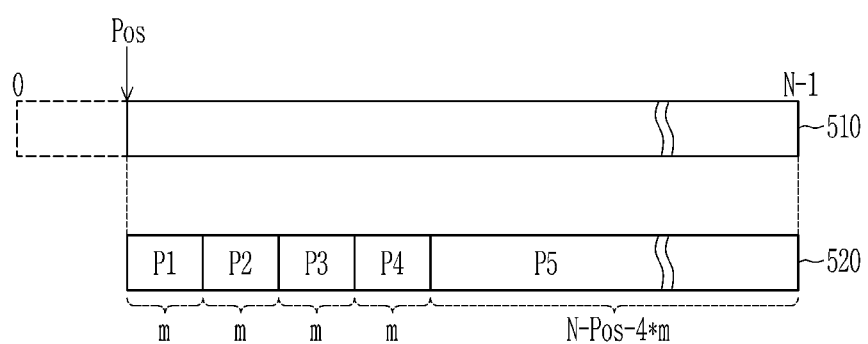
FIG. 5 is a drawing showing an example of unequal partitioning in a merge join method according to an embodiment of the present invention.

FIG. 5 is a drawing showing an example of unequal partitioning in a merge join method according to an embodiment of the present invention. For convenience, FIG. 5 shows an example of unequal partitioning in which data are partitioned into partitions of unequal sizes for a k-ary search where K is 5. However, K is not limited to 5.

As shown in FIG. 5, it is assumed that there are N total data 510 and a current position is Pos. A k-ary search module 123 may partition data after the current position (520) so that each of (K−1) partitions P1, P2, P3, and P4 close to the current position has the same number of data, i.e., m data, and the last partition P5 has all the remaining data, i.e., (N−Pos−4·m) data.

Figure 6:
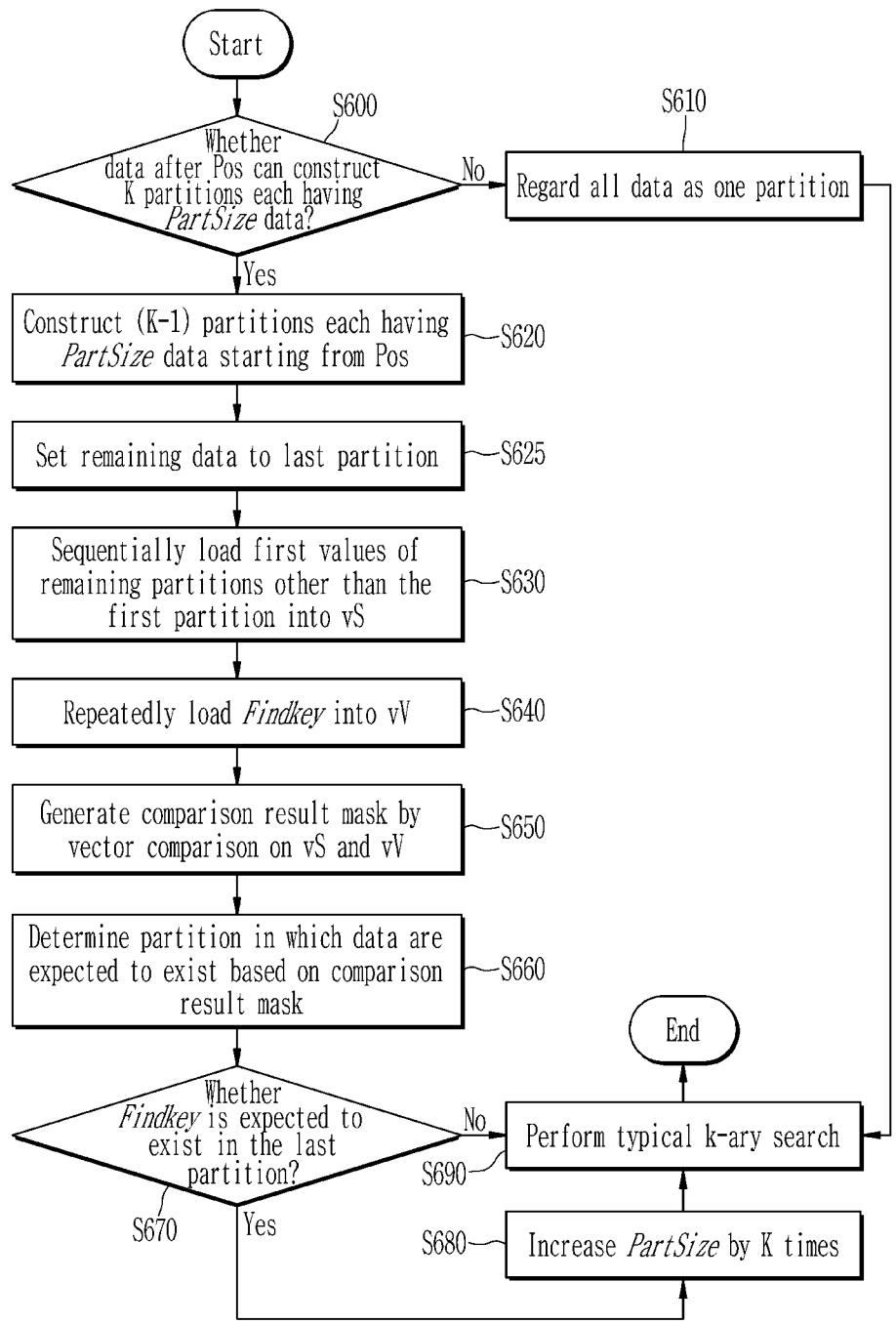
FIG. 6 is a flowchart showing a modified k-ary search method in a merge join method according to an embodiment of the present invention.

FIG. 6 is a flowchart showing a modified k-ary search method in a merge join method according to an embodiment of the present invention.

Referring to FIG. 6, in step S600, a k-ary search module 123 first checks whether data after the current position Pos can construct K partitions each having PartSize data. That is, in step S600, the k-ary search module 123 determines whether the number of data after the current position Pos is greater than or equal to PartSize*K in step S600.

If K partitions each having PartSize data cannot be constructed as the check result, the k-ary search module 123 regards all the data after the current position as one partition in step S610, and performs a typical k-ary search based on equal partitioning in step S690. That is, all the data of the partition are divided into K partitions of the same size to be searched in step S690.

If K partitions each having PartSize data can be constructed as the check result, the k-ary search module 123 performs a k-ary search based on unequal partitioning in steps S620 to S660. First, in step S620, the k-ary search module 123 constructs (K−1) partitions each having PartSize data, starting from the current position Pos. The k-ary search module 123 sets all remaining data after constructing the (K−1) partitions to a last partition in step S625.

In steps S630 to S660, the k-ary search module 123 compares the first value of each of the plurality of partitions with a key value FindKey to be searched to determine a partition in which data are expected to exist. That is, a partition in which the comparison result is changed may be determined as the partition in which the data are expected to exist. If data of a column are sorted in ascending order, the comparison may be performed to determine whether the first value is greater than or equal to the key value FindKey to be searched. In one embodiment, the plurality of partitions may be partitions other than the first partition.

In some embodiments, in step S630, the k-ary search module 123 sequentially loads the first values of the remaining partitions other than the first partition into a vector register vS. That is, the vector register vS stores [$p_2$ $p_3$ . . . $p_K$] where $p_i$ is the first value of the i-th partition. In step S640, the k-ary search module 123 repeatedly loads the key value FindKey to be searched into a vector register vV. That is, the vector register vV stores [FindKey FindKey . . . FindKey]. In step S650, the k-ary search module 123 performs a vector comparison (an element-wise comparison) on the two vector registers vS and vV to generate a comparison result mask having a comparison result of each element as a corresponding element. In step S660, the k-ary search module 123 determines the partition in which the data are expected to exist by using the comparison result. In one embodiment, the comparison result mask may be generated by setting the comparison result to '1' if each element of the vector register vS is greater than or equal to the corresponding element FindKey of the vector register vV, and setting the comparison result to '0' otherwise. In this case, the partition in which the data are expected to exist may be determined based on the element in which the value of the comparison result mask is changed (i.e., the element whose value is changed from '0' to '1'). In one embodiment, when a plurality of n-bit registers are used as the vector registers, the k-ary search module 123 may generate a most significant bit of the comparison result of each element as the corresponding element of the comparison result mask, thereby reducing the computation The k-ary search module 123 performs the typical k-ary search based on equal partitioning on the partition in which the data are expected to exist. For example, a k-ary search suggested by Benjamin et al. may be used as the typical k-ary search (see "*K-ary search on modern processors*", Proceedings of the Fifth International Workshop on Data Management on New Hardware, 2009, Pages 52-60).

In some embodiments, the k-ary search module 123 may check whether the partition in which the data are expected to exist is the last partition in step S670. If the partition in which the data are expected to exist is the last partition as the check result (Yes in step S670), k-ary search module 123 may increase a partition size PartSize by K times in step S680, and then perform a typical k-ary search on the last partition in step S690. Further, if the partition in which the data are expected to exist is not the last partition as the check result (No in step S670), k-ary search module 123 may perform the typical k-ary search on the partition in which the data are expected to exist in step S690.

As described with reference to FIG. 6, in one embodiment, the k-ary search module 123 may perform the unequal partitioning of dividing the data into partitions of unequal sizes in the first round (i.e., a round for reducing the search range) (S610 to S660), and then perform the equal partitioning of dividing the data into partitions of the same size in subsequent rounds in step S690.

In another embodiment, the k-ary search module 123 may perform the k-ary search based on unequal partitioning in the subsequent rounds (for example, S690) as well as the first round.

In the unequal partitioning, when the last partition is selected in the first round (Yes in step S670), more comparisons may be repeated in step S690 than a case where the other partition is selected. Thus, in order to reduce this possibility in the next round, the k-ary search module 123 may expand the partition size PartSize to K times of the current size and store the expanded size in storage in step S680. As such, the k-ary search based on unequal partitioning that reflects the data distribution can be performed by updating the partition size according to the data distribution during the merge join execution.

In some embodiments, the search control module 121 may determine the partition size PartSize to be used for the initial partitioning for the k-ary search, considering a rate of the number of data in the two columns participating in the join and the number of comparisons of the k-ary search. Such an embodiment is described with reference to FIG. 7.

Figure 7:
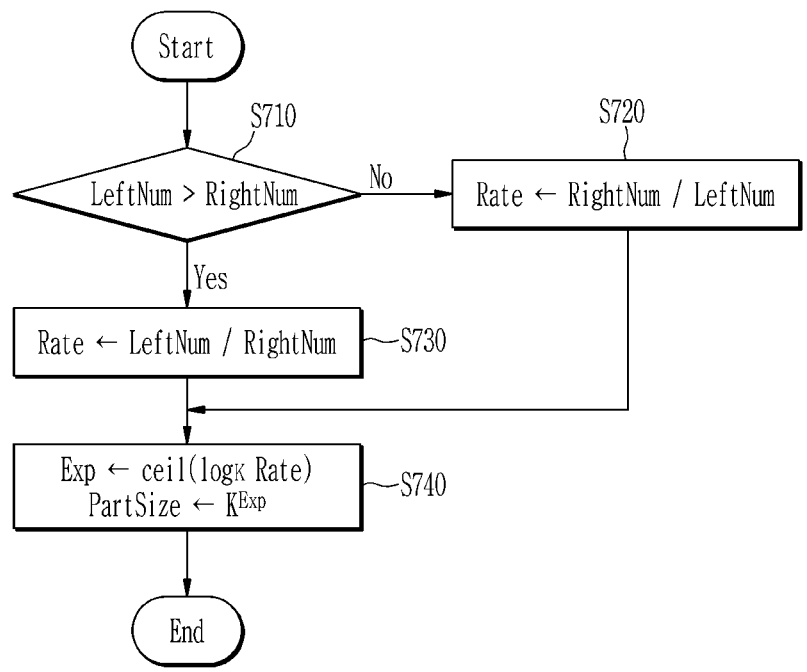
FIG. 7 is a drawing showing an example of determining a partition size for initial partitioning in a merge join method according to an embodiment of the present invention.

FIG. 7 is a drawing showing an example of determining a partition size for initial partitioning in a merge join method according to an embodiment of the present invention.

It is assumed in FIG. 7 that two columns LeftC and RightC participate in merge join, the number of data in the column LeftC is LeftNum, and the number of data in the column RightC is RightNum. Referring to FIG. 7, in step S710, a search control module 121 compares the number of data LeftNum of the column LeftC participating in the merge join with the number of data RightNum of the column RightC participating in the merge join. As the comparison result, the search control module 121 divides a large number by a small number to calculate a rate of the numbers of data Rate in steps S720 and S730. That is, if LeftNum is larger than RightNum, the search control module 121 determines LeftNum/RightNum as the rate Rate in step S730. Otherwise, the search control module 121 determines RightNum/LeftNum as the rate Rate in step S720.

Next, the search control module 121 sets a partition size PartSize as the largest number among the numbers of data which can be searched with the same number of comparisons as a case where the number of data is Rate when the k-ary search is performed. Thus, the desired data can be searched in the maximum data range with the minimum comparisons. In one embodiment, the partition size PartSize may be determined by Equation 1.

$$\text{PartSize} = K^{ceil(\log_K Rate)} \qquad \text{Equation 1}$$

In Equation 1, Rate is the ratio of the numbers of data and ceil( ) is a function that maps an input to the least integer greater than or equal to the input.

For example, it is assumed that the number of data in the join column LeftC is 1000 and the number of data in the join column RightC is 15000 when the k-ary search where K is 5 is performed. Then, the ratio of the numbers of data Rate is 15, and the partition size PartSize is determined as 25 as in Equation 2.

$$\text{PartSize} = 5^{ceil(\log_5 15)} = 5^{ceil(1.6826)} = 5^2 = 25 \qquad \text{Equation 2}$$

Upon determining that a value to searched does not exist in a range corresponding to the K−1 times of PartSize (i.e., determining that the value to be searched exists in the last partition), the search control module 121 may increase PartSize by K times and use the K times of PartSize as the partition size in the next round. As exemplified above, when PartSize is 25 and the data to be searched exist in the last partition, the search control module 121 may set 25*5 (=125) as the partition size PartSize in the next round to perform the k-ary search. Accordingly, the k-ary search can be performed with the minimum comparisons in accordance with the data distribution.

In another embodiment, the k-ary search based on unequal partitioning may be performed by using the changed partition size in the search for next data to be searched, rather than the current search in progress.

Next, a method of selecting either a sequential search or a modified k-ary search in a merge join method according to an embodiment of the present invention is described with reference to FIG. 8.

Figure 8:
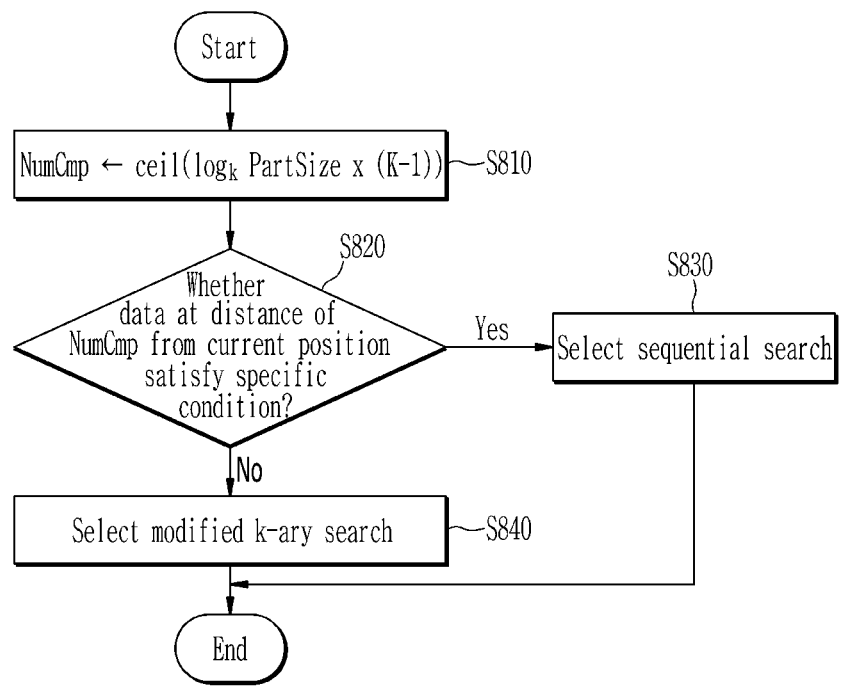
FIG. 8 is a flowchart showing a search selection method in a merge join method according to an embodiment of the present invention.

FIG. 8 is a flowchart showing a search selection method in a merge join method according to an embodiment of the present invention.

A search control module 121 of a data search unit 120 may compare costs estimated based on the number of comparisons and then select a method that is less expensive between a sequential search and a k-ary search.

As described above, a k-ary search module 123 divides a search range into K partitions and compares (K−1) data corresponding to boundaries of the K partitions at once using a vector comparison, thereby reducing the range of data to be searched to (1/K). This process is performed by presuming that the data to be searched exist within (K−1) *PartSize due to the locality of the sorted data in most cases. Therefore, the number of comparisons NumCmp in the modified k-ary search is determined by presuming that the data to be searched exist in the (K−1) partitions rather than the last partition. For example, the number of comparisons NumCmp may be calculated as in Equation 3.

$$\text{NumCmp} = \text{ceil}(\log_K \text{PartSize} \times (K-1)) \qquad \text{Equation 3}$$

Therefore, if the data to be searched exist before the NumCmp-th position from the current position, a cost of the sequential search may be lower than a cost of the modified k-ary search. In some embodiments, as shown in FIG. 8, a search control module 121 may calculate the number of comparisons NumCmp required for the modified k-ary search at the current position in step S810, and may determine whether data at a distance of NumCmp from the current position satisfy a specific condition (for example, whether a value of the data is greater than or equal to a value to be searched) in step S820. The search control module 121 may select the sequential search in step S830 if the data satisfy the specific condition, and may select the modified k-ary search in step S840 if the data do not satisfy the specific condition. Accordingly, the number of comparisons can be decreased.

As described above, according to an embodiment of the present invention, the number of comparisons for determining subsets to participate in the merge join can be decreased by reducing the search range using the locality of the data. In addition, the number of comparisons can be further decreased by performing the vector comparison.

Therefore, an embodiment of the present invention can increase the processing speed of the database on the query by quickly performing the merge join, and use the parallel processing based on the vector registers in the processor supporting the vector processing. Accordingly, the function of the database or processor can be improved among the functions of the computing device.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A method performed by a processor of a merge join system including the processor and a database, the method comprising:
    starting at a current position of a join column participating in merge join in the database, dividing data of the join column into K−1 (K being greater than 2) partitions each having a same first size, located after a location of the current position, and constructing a last partition of a second size different from the first size, the last partition containing data remaining in the join column and not included in the K−1 partitions after constructing the K−1 partitions;
    comparing a first value of each of the K−1 partitions with a value to be searched for a merge join, in order to check whether the first value is within a range of the value to be searched;
    determining a partition of the K−1 partitions and the last partition in which the value to be searched is expected to exist based on a comparison result; and
    applying a k-ary search to the determined partition.

2. The method of claim 1, wherein the second size is greater than the first size.

3. The method of claim 2, further comprising, when the determined partition is the last partition, increasing a partition size to be used in a next search to a third size.

4. The method of claim 3, wherein the third size is K times the first size.

5. The method of claim 3, wherein the applying the k-ary search comprises:
    dividing the last partition into Knew partitions of unequal size;
    comparing a first value of each of remaining new partitions excluding a first new partition from the Knew partitions with the value to be searched in order to check whether a first value of each of the remaining new partitions is within the range of the value to be searched;
    determining a new partition in which the value to be searched is expected to exist based on a comparison result; and
    applying a k-ary search to the determined new partition.

6. The method of claim 2, further comprising determining $K^{ceil(\log_K Rate)}$ as the first size,
    wherein the ceil( ) is a function that maps an input to a least integer greater than or equal to the input, and
    wherein the Rate is a first number divided by a second number, and the first number and the second number are a large number and a small number, respectively, between a number of data in the join column and a number of data in another column participating in the merge join.

7. The method of claim 1, wherein the applying the k-ary search comprises performing the k-ary search, which equally divides the determined partition into K partitions, to the determined partition.

8. The method of claim 1, wherein the comparing the first value comprises:
    sequentially loading the first values of the K−1 partitions into a first vector register;
    loading the value to be searched into a second vector register; and performing a vector comparison on the first vector register and the second vector register to generate a comparison result mask,
wherein the determining the partition comprises determining the partition in which the value to be searched is expected to exist based on the comparison result mask.

9. The method of claim 8, wherein the generating the comparison result mask comprises generating the comparison result mask by using a most significant bit of a comparison result between each element of the first vector register and a corresponding element of the second vector register.

10. A method performed by a processor of a merge join system including the processor and a database, the method comprising:
selecting a search method to be used for a current position of a join column participating in merge join in the database from among a plurality of search methods including a modified k-ary search; and
performing the modified k-ary search when the modified k-ary search is selected,
wherein the performing the modified k-ary search comprises:
dividing data of the join column into K−1 (K being greater than 2) partitions each having a same first size, located after a location of the current position, and constructing a last partition of a second size different from the first size, the last partition containing data remaining in the join column and not included in the K−1 partitions after constructing the K−1 partitions;
comparing a first value of each of the K−1 partitions with a value to be searched for a merge join, in order to check whether the first value is within a range of the value to be searched;
determining a partition of the K−1 partitions and the last partition in which the value to be searched is expected to exist based on a comparison result; and
applying a k-ary search to the determined partition.

11. The method of claim 10, wherein the selecting the search method comprises:
estimating a cost based on a number of comparisons required for each of the plurality of search methods at the current position; and
selecting a search method which requires a least cost from among the plurality of search methods.

12. The method of claim 10, wherein the plurality of searches further includes a sequential search,
wherein the selecting the search method comprises:
calculating a number of comparisons required for a k-ary search;
determining whether a value at a position apart from the current position by the number of comparisons is within the range of the value to be searched; and
selecting the sequential search when the value at the position apart from the current position is within the range of the value to be searched, and selecting the modified k-ary search when the value at the position apart from the current position is not within the range of the value to be searched.

13. The method of claim 12, wherein the number of comparisons is determined as ceil ($\log_K$ PartSize×(K−1)),
wherein the cell( ) is a function that maps an input to a least integer greater than or equal to the input, and
wherein the PartSize is a partition size used when dividing the data into the K−1 partitions.

14. The method of claim 13, wherein the first size is the PartSize, and the second size is a size greater than the PartSize.

15. A system comprising:
a storage device that stores a database; and
a processor that:
upon using a modified k-ary search,
starting at a current position of a join column participating in merge join in the database, divides data of the join column into K−1 (K being greater than 2) partitions having a same first size located after a location of the current position, and constructs a last partition of a second size different from the first size, the last partition containing data remaining in the join column and not included in the K−1 partitions after constructing the K−1 partitions;
compares a first value of each of the K−1 partitions with a value to be searched for a merge join, in order to check whether the first value is within a range of the value to be searched;
determines a partition of the K−1 partitions and the last partition in which the value to be searched is expected to exist based on a comparison result; and
applies a k-ary search to the determined partition.

16. The merge join system of claim 15, wherein the second size greater than the first size.

17. The system of claim 16, wherein when the determined partition is the last partition, the processor increases a partition size to be used in a next search to K times the first size.

18. The system of claim 16, wherein the processor determines $K^{ceil(\log_K Rate)}$ as the first size,
wherein the cell( ) is a function that maps an input to a least integer greater than or equal to the input, and
wherein the Rate is a first number divided by a second number, and the first number and the second number are a large number and a small number, respectively, between a number of data in the join column and a number of data in another column participating in the merge join.

19. The system of claim 15, wherein the processor:
sequentially loads the first values of the K−1 partitions to a first vector register;
loads the value to be searched to a second vector;
performs a vector comparison on the first vector register and the second vector register to generates a comparison result mask; and
determines the partition in which the value to be searched is expected to exist based on the comparison result mask.

20. The system of claim 15, wherein the processor estimates a cost based on a number of comparisons required for each of a plurality of search methods including the modified k-ary search at the current position, and selects a search method which requires a least cost from among the plurality of search methods.

* * * * *